United States Patent
Keidar et al.

(10) Patent No.: US 10,508,036 B2
(45) Date of Patent: Dec. 17, 2019

(54) SYSTEM AND METHOD FOR MASS PRODUCTION OF GRAPHENE PLATELETS IN ARC PLASMA

(71) Applicants: Michael Keidar, Baltimore, MD (US); Alexey Shashurin, Rockville, MD (US)

(72) Inventors: Michael Keidar, Baltimore, MD (US); Alexey Shashurin, Rockville, MD (US)

(73) Assignee: The George Washington University, Washington, DC (US)

( * ) Notice: Subject to any disclaimer, the term of this patent is extended or adjusted under 35 U.S.C. 154(b) by 383 days.

(21) Appl. No.: 15/346,380

(22) Filed: Nov. 8, 2016

(65) Prior Publication Data

US 2017/0217776 A1    Aug. 3, 2017

Related U.S. Application Data

(62) Division of application No. 13/910,699, filed on Jun. 5, 2013, now abandoned.

(60) Provisional application No. 61/658,665, filed on Jun. 12, 2012.

(51) Int. Cl.
*C01B 32/186* (2017.01)
*B82Y 30/00* (2011.01)
*B82Y 40/00* (2011.01)

(52) U.S. Cl.
CPC ............ *C01B 32/186* (2017.08); *B82Y 30/00* (2013.01); *B82Y 40/00* (2013.01); *C01B 2204/02* (2013.01); *Y10S 977/734* (2013.01); *Y10S 977/843* (2013.01)

(58) Field of Classification Search
CPC ....... B82Y 30/00; B82Y 40/00; C01B 32/186; C01B 2204/02; Y10S 977/734; Y10S 977/843
USPC ........................................ 204/192.38, 298.41
See application file for complete search history.

(56) References Cited

U.S. PATENT DOCUMENTS

| 6,435,130 | B1 | 8/2002 | Takaki |
| 2004/0168637 | A1 | 9/2004 | Gorokhovsky |
| 2007/0092431 | A1 | 4/2007 | Resasco |
| 2007/0166539 | A1 | 7/2007 | Zhao |

(Continued)

OTHER PUBLICATIONS

Gattia et al. "AC arc discharge synthesis of single-walled nanohorns and highly convoluted graphene sheets", Nanotechnology 18 (May 2007), pp. 1-7 (Year: 2007).*

(Continued)

*Primary Examiner* — Rodney G McDonald
(74) *Attorney, Agent, or Firm* — Blank Rome LLP (57) ABSTRACT

A system and method for producing graphene includes a heating block, substrate, motor and collection device. The substrate is arranged about the heating block and is configured to receive heat from the heating block. A motor is connected to the substrate to rotate the substrate about the heating block. A cathode and anode are configured to direct a flux stream for deposit onto the rotating substrate. A collection device removes the deposited material from the rotating substrate. A heating element is embedded in the heating block and imparts heat to the heating block. The heating block is made of cement or other material that uniformly disperses the heat from the heating element throughout the heating block. The flux stream can be a carbon vapor, with the deposited flux being graphene.

20 Claims, 6 Drawing Sheets

(56) References Cited

U.S. PATENT DOCUMENTS

2010/0177462 A1 7/2010 Adzic et al.
2012/0128574 A1 5/2012 Barker

OTHER PUBLICATIONS

Levchenko et al. "The large-scale production of graphene flakes using magnetically-enhanced arc discharge between carbon electrodes", Carbon 48 (Aug. 2010), 4556-4577 (Year: 2010).*
Li et al. "Chemical vapor deposition of large area few layer graphene on Si catalyzed with nickel films", Thin Solid Films 518 (2010), S128-S132 (Year: 2010).*
Reina et al. "Transferring and Identification of Single- and Few-Layer Graphene on Arbitrary Substrates", J. Phys. Chem. C, vol. 112, No. 46, pp. 17741-17744, 2008. (Year: 2008).*
J. Li, et al., "Simultaneous Synthesis of Single-Walled Carbon Nanotubes and Graphene in a Magnetically-Enhanced Arc Plasma," Journal of Visualized Experiments, Feb. 2012, pp. 1-6.
M. Keidar, et al., "Increasing the Length of Single Wall Carbon Nanotubes in a Magnetically Enhanced Arc Discharge,"Applied Physics Letters, 92, 043129, 2008.
I Levchenko, et al., "The Large Scale Production of Graphene Flakes Using Magnetically-Enhanced Arc Discharge Between Carbon Electrodes," Carbon, vol. 48, Issue 15, 2010, pp. 4570-4574.

* cited by examiner

Figure 3H

SYSTEM AND METHOD FOR MASS PRODUCTION OF GRAPHENE PLATELETS IN ARC PLASMA

RELATED APPLICATIONS

The present application is a divisional application of Ser. No. 13/910,699, filed Jun. 5, 2013, which claims priority to provisional application No. 61/658,665. The entire contents of those applications are hereby incorporated by reference. The present application also incorporates by reference the article Simultaneous Synthesis of Single-Walled Carbon Nanotubes and Graphene in a Magnetically-Enhanced Arc Plasma, Journal of Visualized Experiments, www.jove.com, February 2012, 60, e3455, 6 pages.

GOVERNMENT LICENSE RIGHTS

This invention was made with Government support under NSF Grant Nos. CBET-0853777, STTR-1010133 and DOE Grant No. DE-SC0001169 awarded by the National Science Foundation and Department of Energy, respectively. The Government has certain rights in this invention.

BACKGROUND OF THE INVENTION

Field of the Invention

The present invention relates to a system for producing graphene. More particularly, the present invention relates to a system for producing graphene in bulk quantities and low cost.

Background of the Related Art

Graphene is a one or a few atoms thick planar sheet of sp2-bonded carbon atoms that are densely packed in a honeycomb crystal lattice. A variety of outstanding graphene characteristics—such as high-carrier mobility, superior mechanical properties, extremely high surface area and thermal conductivity—leads to its potential application in carbon-based flexible and stretchable electronics, high-frequency transistors and magneto-electronic devices. However, before graphene material can be applied to commercial applications, it is necessary to find lower cost methods of mass production of high quality graphene platelets. This invention presents a plasma-based approach for mass production of high quality graphene platelets at low cost.

SUMMARY OF THE INVENTION

Accordingly, it is an object of the invention to provide a system and method for producing graphene. It is another object of the invention to provide a system and method for producing graphene at low cost, high volumes, and/or suitable for commercial applications. It is a further object of the invention to provide a system and method for producing graphene having a uniform size.

In accordance with these and other objects of the invention, the present invention is a system and method for producing graphene. The system includes a heating block configured to provide heat. A substrate is arranged about the heating block and is configured to receive heat from the heating block. A motor is connected to the substrate to rotate the substrate about the heating block. A cathode and anode are configured to direct a flux stream for deposit onto the rotating substrate. A collection device removes the deposited material from the rotating substrate. A heating element is embedded in the heating block and imparts heat to the heating block. The heating block is made of cement or other material that uniformly disperses the heat from the heating element throughout the heating block. The flux stream can be a carbon vapor, with the deposited flux being graphene.

These and other objects of the invention, as well as many of the intended advantages thereof, will become more readily apparent when reference is made to the following description, taken in conjunction with the accompanying drawings.

BRIEF DESCRIPTION OF THE FIGURES

FIGS. 3(g), (h) are TEM image of graphene flake and electron diffraction pattern showing the crystalline structure of graphene.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

Figure 1:
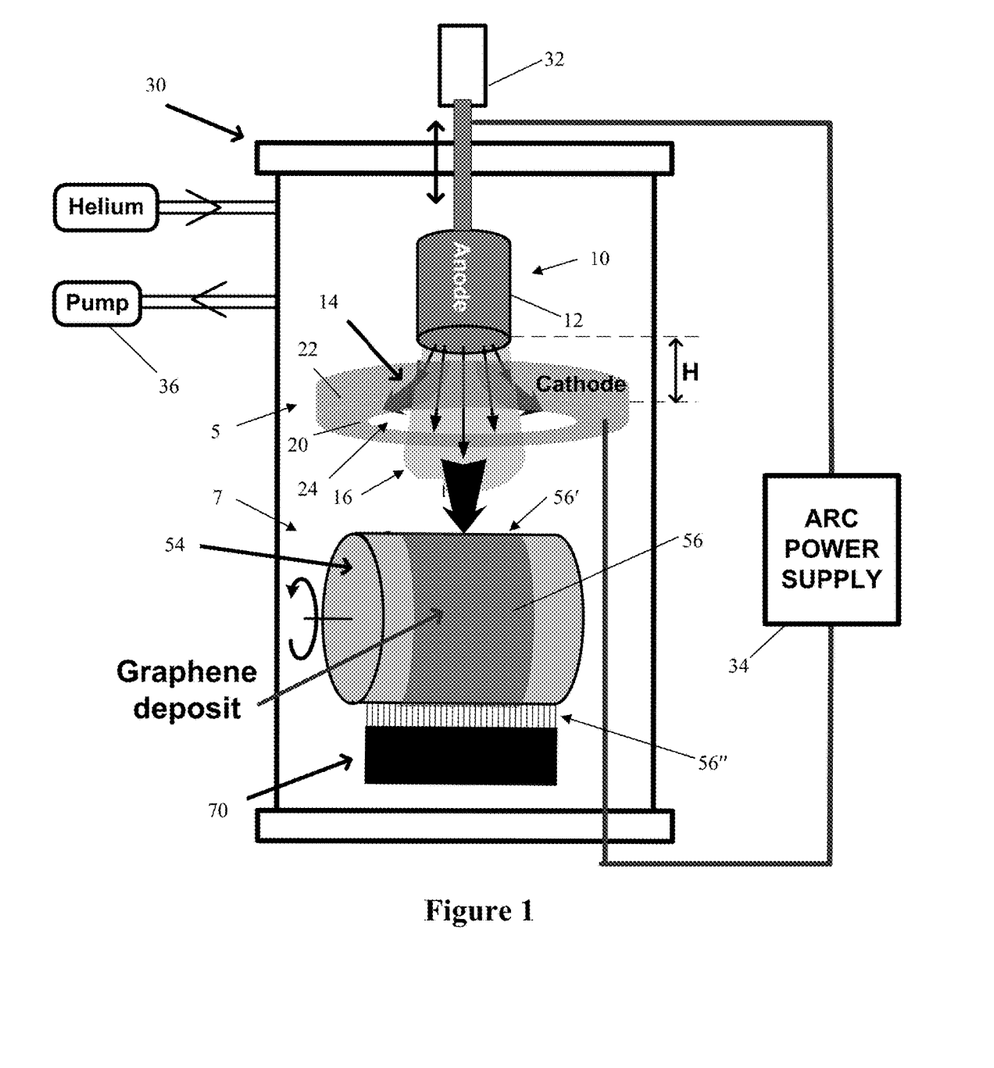
FIG. 1 shows the geometry of discharge electrodes in accordance with the invention.

The present invention provides a plasma-based approach for mass production of high quality graphene platelets at low cost having an arc discharge assembly 5 and a substrate assembly 7, as shown in FIG. 1. The arc discharge assembly 5 produces an arc discharge that is directed onto a substrate of the substrate assembly 7.

In accordance with the invention, a closed chamber 30 is provided for conducting synthesis, and encloses the arc discharge assembly 5 as well as the substrate assembly 7, as shown. Prior to synthesis, the chamber 30 is pumped down using a pump 36, to the pressures of at least $10^{-1}$-$10^{-2}$ Torr, e.g. by the mechanical rotary pump as shown in FIG. 1, and then filled in by helium with a purity of 99.995% to the pressure of 500 Torr. Synthesis can be also conducted in range of pressures of about several hundred Torr. Other background gases can be also used such as nitrogen, air etc. Background gas and its pressure provides the discharge mode required for the graphene synthesis to occur, and creates conditions on the substrate favorable for the synthesis.

The arc discharge assembly 5 includes an anode 10, cathode 20, and positioning system 32. Thus, the chamber 30 is equipped with a pair of discharge electrodes, namely the anode 10 and the cathode 20, which are shown in FIG. 1. The anode material is consumed during the synthesis, i.e. the anode length decreases during the arc discharge, while the anode diameter remains constant. The electrodes 10, 20 are separated from each other by the discharge gap H. The preferred size of the arc discharge gap H is from zero up to about 10 centimeters. The specific value of gap H is determined to minimize losses of the ablated material on the cathode surface while providing stable operation of the discharge.

As shown, the anode 10 has a cylindrical shape and is made of a pure graphite rod 12 with a diameter $OD_a$. The anode rod 12 is attached to a positioning system 32 as shown in FIG. 1, which feeds the anode rod 12 as it is consumed by the discharge in order to keep the same distance H to the cathode 20. It is noted than any suitable positioning system 32 can be provided that can feed the anode 10 as it consumed during the synthesis. The positioning system 32 can be located outside the chamber 30 with a support rod entering into the chamber 30 through an opening in a top plate of the chamber 30. The support rod is coupled with the anode 10. The diameter of the anode 10 $OD_a$ can be up to few centimeters if the arc discharge current $I_{arc}$ is correspondingly increased to several hundred amperes. As non-limiting examples of the invention, for an anode diameter of 1/16 inches, the preferred current is about 50 A; while if the anode diameter is about 2 cm the current should be increased to several hundred Amperes (up to 500-600 A).

The cathode 20 can be made of graphite or metal and can have a different geometry such as a ring 22, as shown, or other suitable shape such as a plate with a through hole or a torus. The ring 22 has an inner diameter $ID_c$ that defines a central opening or through-hole 24. The inner diameter $ID_c$ of the cathode 20 is larger than the outer diameter $OD_a$ of the anode rod 12, so that the anode rod 12 (and/or the flux) can go through the center opening 24 of the cathode 20.

As further shown, the electrodes 10, 20 are connected to an arc power supply 34. Any suitable power supply 34 can be utilized. The power supply 34 provides a continuous direct current in the range from about 10 A to about 600 A, and voltages up to 40-70 Volts. The power supply 34 is located outside the chamber 30 and is connected to the cathode 20 through an opening in a bottom plate (as shown) or a side wall of the chamber 30.

Figure 2:
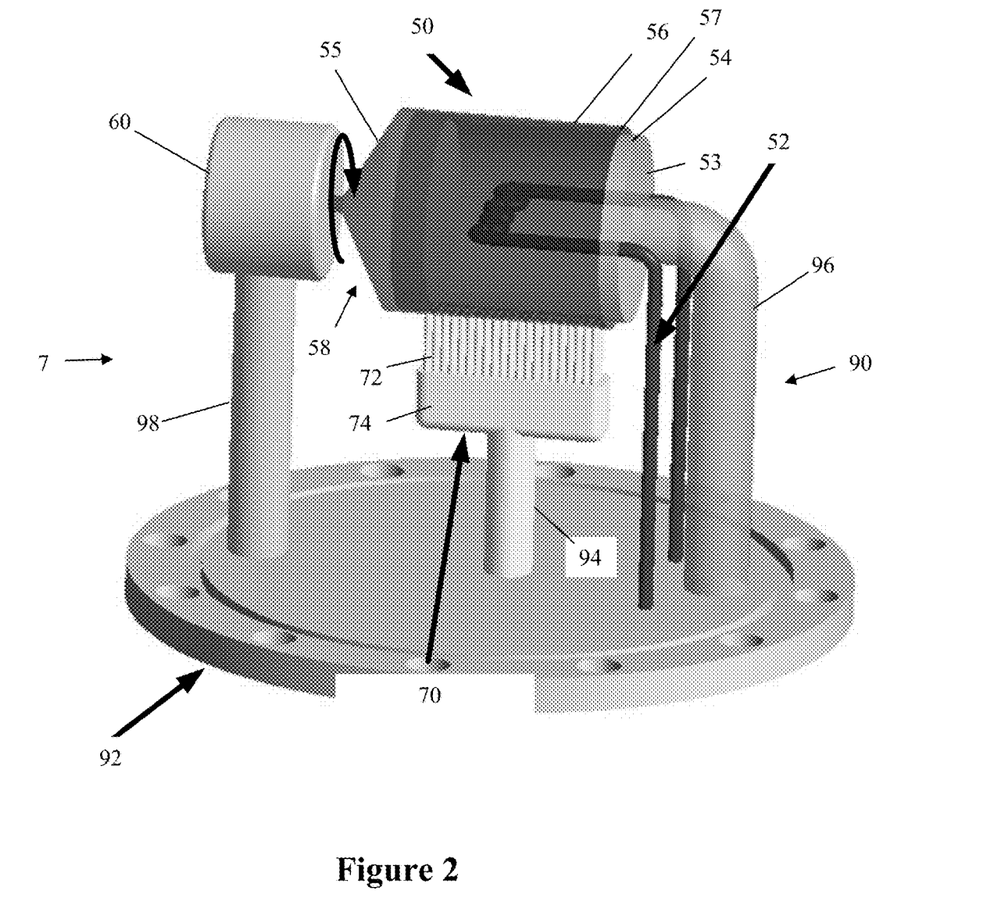
FIG. 2 shows schematics of movable rotating substrate assembly.

The schematics of the substrate assembly 7 are best shown in FIG. 2. It includes a hot metal substrate assembly 50, a graphene removing system 70 for removing the synthesized graphene product immediately after its synthesis, and a support assembly 90. The hot metal substrate assembly 50 includes a heating element 52, a cylindrical block 54, and a substrate 56. The heating element 52 is shown as a nickel-chromium resistant wire. The cylindrical block 54 is a solid block of high temperature cement that has a proximal end 53 facing in one direction and an opposite distal end 55 facing in an opposite direction. The heating element 52 is embedded in the cylindrical block 54. It forms a loop that enters and exits the proximal end 53 of the block 54. The portion of the heating element 52 that extends inside the heating block 54 has a general U-shape defined by two legs and a sinusoidal-shaped cross-member. The two legs extend to outside of the block 54.

The heating element 52 can be, for instance, a solid wire that is heated by electrical power. The heating element 52 is configured to heat the cement block 54, and the cement uniformly disburses the heat throughout the block 54 and uniformly heats the substrate 56. The purpose of the heating element 52 is to heat the substrate 56 to temperatures required for synthesis in the range 700-1200° C. The heating element 52 can be powered by the separate power supply or by same electrical current supporting the arc discharge supplied by the power supply 34. Of course, the heating element 52 can be configured in other ways, such as entering and/or exiting through the distal end 55 of the block 54, or extending in a circular pattern concentric with the block 54.

Still yet, other suitable ways to heat the substrate 56 can be utilized such as heating by laser, by electron beam or the substrate can be heated in a self-consistent manner by the hot carbonaceous vapor ablated from the anode or another way. Thus, a separate heating block 54 need not be used, and the substrate 56 can be directly heated.

The substrate 56 for the graphene growth is a copper cylinder that surrounds the cement cylindrical block 54. The substrate 56 has a hollow cylindrical shape with an open distal end 57 that defines a center inside space, and a conical shape top at the proximal end 58. The open distal end 57 receives the cylindrical block 54 in the interior space of the cylindrical substrate 56. Thus, the cylindrical substrate 56 is coaxially formed with the cylindrical block 54, with the block being concentrically arranged with respect to and inside of the substrate 56 and the substrate substantially surrounding the block. The cylindrical cement heating block 54 is not fully received (though can be) within the inner space of the substrate 56, so that the distal end 55 of the heating block 54 does not reach the proximal conical end 58 of the substrate 56. The proximal end 53 of the heating block 54 can be flush with (or protrude or recede from) the distal end of the substrate 56.

The substrate 56 and the heating block 54 are each elongated and have a central longitudinal axis. The substrate 56 and the heating block 54 lie on their sides, such that the longitudinal axes of the substrate 56 and the heating block 54 are substantially horizontal, as shown. Referring back momentarily to FIG. 1, the anode rod 12 is arranged with its longitudinal axis extending substantially vertical so that the end of the anode 12 is substantially horizontal and facing the cathode ring 22. The cathode ring 22 is arranged in a plane that is substantially horizontal and perpendicular to the longitudinal axis of the anode rod 12 and the forward-facing end of the anode 12. In this configuration, the flux 16 is discharged downward from the anode rod 12, through the through-hole 24, and onto the top portion 56' of the substrate 56. However, the present invention is not limited solely to this configuration, and for instance the flux 16 can be directed upward or to the side. Changing of this configuration may result in a change of relative position of the graphene collection system since synthesized graphene falls from the substrate in the direction of gravitational force.

Returning to FIG. 2, the cylindrical substrate 56 has an inner diameter that is greater than the outer diameter of the cylindrical block 54, so that there is a space between the substrate 56 and the block 54. The gap should be small, about 1-2 mm, in order to maximize efficiency of heat transfer from the heating block 54 to the substrate and reduce losses of heat. The preferable diameter of the heating block 54 is in the range of about 1-20 cm, while preferable length of the heating block 54 is about 1-40 cm. The size of the heating block 54 should be larger for larger anode diameter, so that the block 54 and substrate 56 have a size suitable to substantially receive all of the flux 16 that is discharged from the anode 10. The substrate 56 is preferably larger than the dimensions of the flux 16 that is discharged. The substrate 56 is independent of the heating block 54, and the distal end 55 of the substrate 56 is connected to a motor 60 so that the substrate 56 can be rotated by the motor 60, as shown in FIG. 2. Thus, the substrate 56 rotates about the heating block 54, which remains fixed 54.

The substrate 56 is rigid with a preferable thickness in the range of about 1-2 mm. The substrate 56 should be rigid enough to be able to prevent folding or bending of the substrate and touching the heating block 54 when the brush 70 applies pressure to the substrate 56. The brush 70 can exert sufficient pressure to remove the graphene without damaging or moving the substrate 56. A support can also be provided at the distal end of the substrate 56, if needed. The heating block 54 uniformly heats the substrate 56. The substrate 56 is designed to operate at surface temperatures of up to 1000-1100° C. in free radiating conditions. The temperature of the substrate 56 at the synthesis should be in the range 700-1200° C. Different metals with low solubility for carbon can be used as a material for the substrate 56 such as molybdenum, copper, etc.

As shown, the adjustable brush 70 is provided at the bottom portion of the substrate 56. The brush 70 has a general T-shape formed by the vertical support arm 94 and the head. The head includes bristles 72 and a cross-support 74 that holds the bristles 72 in place. In one preferred illustrative non-limiting embodiment, the bristles 72 in the brush are made of brass that is soft enough to prevent scratching the substrate 56, but yet sturdy enough to remove the graphene from the substrate 56. For example, in preferable embodiment 0.1 mm diameter brass bristles are used. The bristles 72 of the brush 70 come into direct physical contact with the bottommost side of the rotating substrate 56 for removing the synthesized product from the substrate 56. By having the brush 70 at the bottom of the substrate 56, the removed product can fall directly to the bottom of the chamber 30 unimpeded, or into a collection chamber positioned at the bottom of the chamber 30. In addition, the substrate 56 is positioned between the brush 70 (at the bottom portion of the substrate 56) and the flux 16 (at the top portion of the substrate 56) so that the brush 70 is not directly exposed to the flux 16 and the flux 16 does not adhere to the brush 70. The brush 70 can extend the entire length of the substrate 56, even if graphene is only deposited on a portion of the substrate 56, as shown in FIG. 1.

Referring to FIG. 2, a support assembly 90 is provided that supports the entire substrate assembly 7 and allows for convenient operation and adjustment of the substrate assembly 7. The support assembly 90 includes a base or flange 92 and support arm members 94, 96, 98. The base 92 can be a flat metal circular plate having a top planar surface. The support arm members 94, 96, 98 are elongated and extend upright from the top planar surface of the base 92. The support arm members 94, 96, 98 connect to the base 92 and each of the brush 70, concrete heating block 54, and motor 60 respectively, to hold those elements 70, 54, 60 in position with respect to one another and with respect to the base 92. The support arms 94, 96, 98 can each be separate elements that are connected to the respective brush 70, cement heating block 54 and motor 60. Or, the support arms 94, 96, 98 can be integrally formed with the respective brush 70, block 54 and motor 60. Still further, a single support arm can connect with two or all of the elements 70, 54, 60. In addition, the arms of the heating element 52 extend downward and through openings (which can include a seal) in the base plate 92, and exit through the bottom side of the base plate 92.

The substrate 56 preferably rotates at speeds of up to several thousand RPMs. Higher substrate speeds lead to the synthesis of thinner nanostructures. The preferred speed of substrate 56 rotation is in the range 100-10,000 RPM. This speed provides exposure time of the substrate 56 to the carbon flux in the range of about 3-300 ms which is preferable for the synthesis. Here, the exposure time refers to the time during which the substrate 56 is facing the discharge, i.e., exposed to the discharge, and is controlled by the rotational speed of the substrate 56. Alternative ways to remove the graphene can be shaking the substrate 50, compressed gas high velocity flow aimed at the substrate, ultrasound etc. The speed of rotation of the substrate 56 can be varied depending on the rate of flux that is generated. The flux strength can be controlled by the current.

Referring back to FIG. 1, the synthesis of graphene is shown. The synthesis occurs as a result of consumption of the anode material. An anodic arc discharge is utilized to provide consumption of the anode 12. The anodic arc discharge heats the anode 12 to the temperatures when it starts to sublimate. Sublimation of the anode 12 leads to creation of a flux containing of plasma-atomic mixture 16 of the carbon vapor and background gas having properties (temperature, composition, density, energies) important for the synthesis. Arc current flow path is indicated by curved arrows in FIG. 1.

The anodic arc discharge 14 is initiated inside the arc discharge gap H between the anode 12 and the cathode 20. It can be initiated by a mechanical touch of the anode 12 and the cathode 20 followed by their immediate separation. Or, it can be initiated by laser breakdown, mechanical trigger and the like. The magnitude of the electrical current of the arc discharge $I_{arc}$ is crucial for overall performance of system. Preferred magnitude of the electrical current of the arc discharge $I_{arc}$ is from about 10 A to about several hundred Amperes. The specific value of $I_{arc}$ will vary depending on the diameter of the anode 12. $I_{arc}$ increases for larger diameters of the anode 12.

As best shown in FIG. 1, the flux 16 of carbon vapor from the anode 12 is delivered to the rotating synthesis substrate assembly in the form of a plasma jet. In this configuration, graphene is being synthesized on a first side 56' (the top, as shown) of the substrate 56 that is exposed to the carbon vapor 16. The graphene forms on the surface of the substrate 56 immediately after the carbon flux reaches the first side 56'. The synthesis of graphene happens instantly at exposure to the carbon flux, so that the synthesis occurs much sooner than the period of revolution of the substrate 56 and is complete before it is to be removed by the brush 70. In one illustrative, non-limiting embodiment, the graphene formation time can be $10^{-3}$ seconds.

The graphene is then removed from the substrate 56 at a second side 56" by brushes of the removing system 70 after the substrate 56 rotates a one-half turn. As shown, the second side 56" of the substrate 56 is substantially opposite from the first side 56' of the substrate 56. The specific geometrical design of the substrate system can be different. The main purpose of this unit is to deliver maximum of the carbon flux to the hot substrate and minimize losses related with deposit of the carbon flux on the removing system and other surroundings and thus in turn to maximize efficiency of transfer of carbon flux to the form of graphene.

The graphene material that is removed from the substrate 56 is the final product of this invention. The graphene can be a one or few atom (can be up to several tens of layers) thick planar sheets of sp2-bonded carbon atoms having a honeycomb crystal lattice structure, though any suitable thickness for a desired application can be achieved. The graphene can be utilized for any commercial application, but is especially well-suited for electrodes for batteries or super capacitors, fuel cells or composite materials. Accordingly, the system and method of the invention provides mass production of graphene. Graphene platelets can be produced in bulk in tens of tons at low cost since graphene is synthesized directly from the raw carbon material without need to utilize any expensive chemicals.

In accordance with one non-limiting embodiment of the invention for purposes of illustration, synthesis can be performed using a cylindrical stainless-steel chamber 30

(254 mm length and 152 mm diameter). Initially the chamber 30 can be pumped down to the pressure less than $10^{-1}$ Torr vacuum and then filled in by helium with purity of 99.995%. The anode 12 is attached to a linear drive system, which keeps the predetermined gap distance according to the desired arc voltage after the discharge is initiated. An arc 14 is initiated between two cylindrical electrodes, the cathode 20 and the anode 12, using fuse wire or by mechanical touching of arc electrodes following by their immediate separation. The cathode 20 is a stainless steel ring with an inner diameter $ID_c$=10 mm, outer diameter $OD_c$25 mm and height of 2 mm. The anode 12 is a pure carbon rod (POCO EDM-3) with a diameter of 1/16 inches. The synthesis is conducted at an arc current 14 of 50 A, with an interelectrode gap distance H of about 1-2 mm, and a helium pressure of 500 Torr. These discharge parameters corresponded to arc voltage in the range 30-40 V. The temperature of the synthesis substrate 56 was 1,000° C. and its exposure time to the carbon flux is about 16-60 ms. A 25 μm thick copper foil substrate 56 with an area of about 1×1 $cm^2$ is used. The distance between the anode 10 and the substrate 56 is as small as possible to collect the entire flux from the cathode 20 and minimize losses of carbon material; but also large enough to prevent damage to the substrate 56 due to overheating by the discharge. In one preferred embodiment, the distance between the anode 10 and the substrate 56 is 0.5-10 centimeters.

Figure 3A:
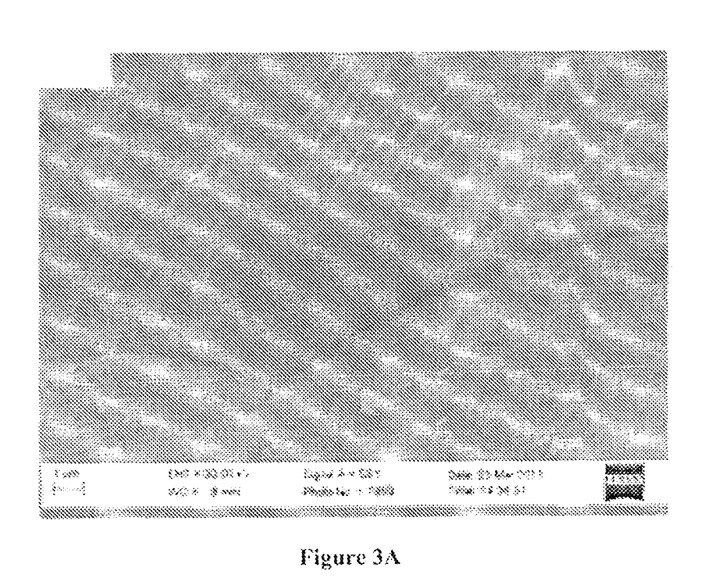
FIGS. 3(a)-(c) are SEM images of as grown graphene film on the copper foil and mechanically transferred to TEM grid.
Figure 3B:
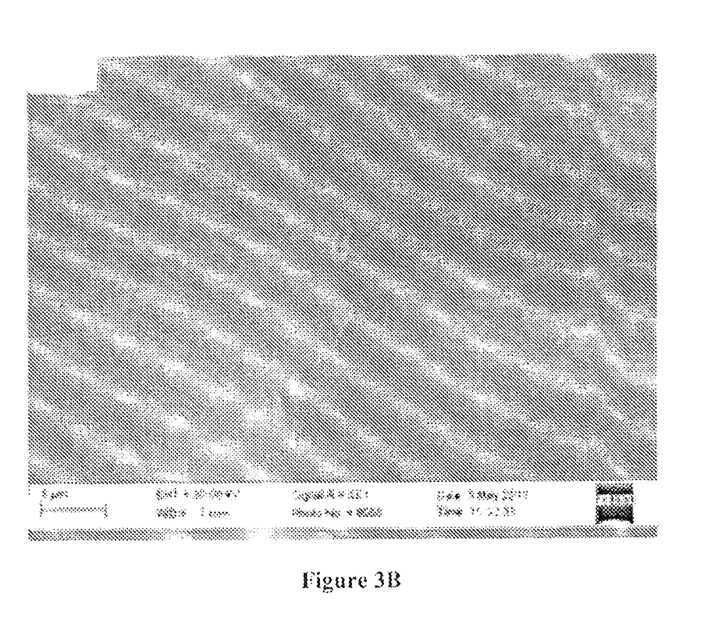
Figure 3C:
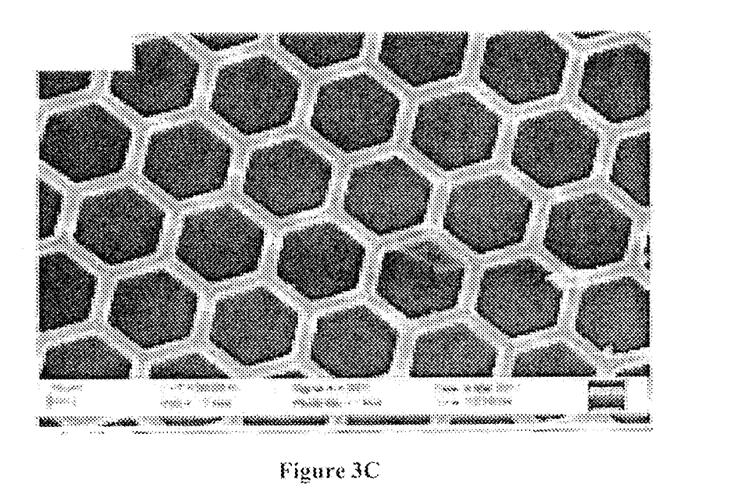
Figure 3D:
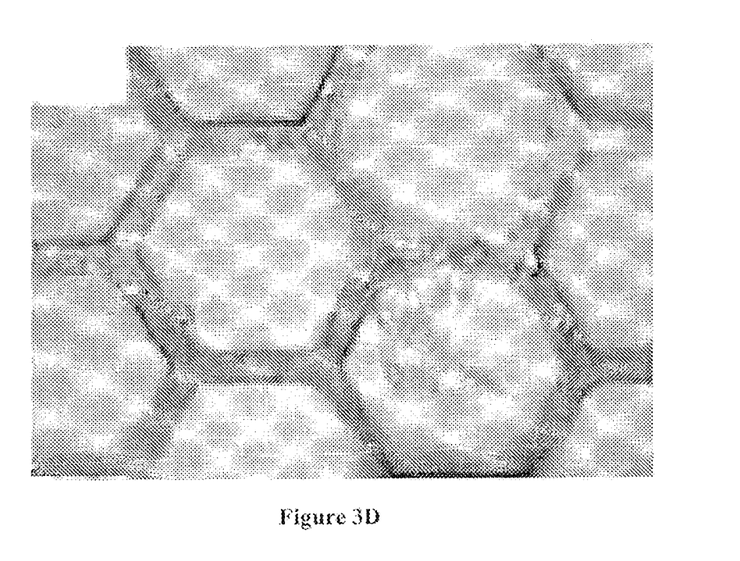
FIGS. 3(d)-(f) are optical microscope image and Raman spectra of synthesized graphene platelets.
Figure 3E:
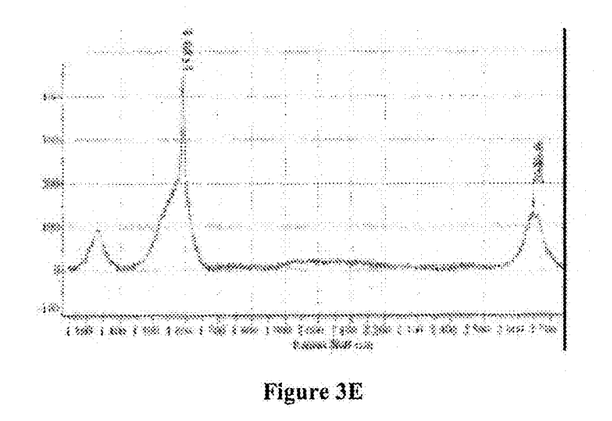
Figure 3F:
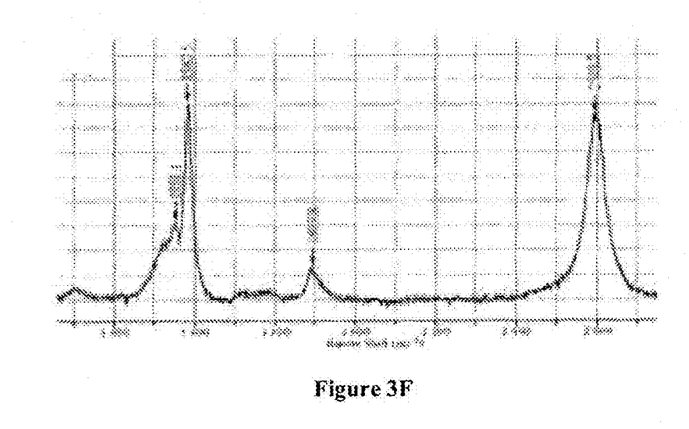
Figures 3G, 3H:
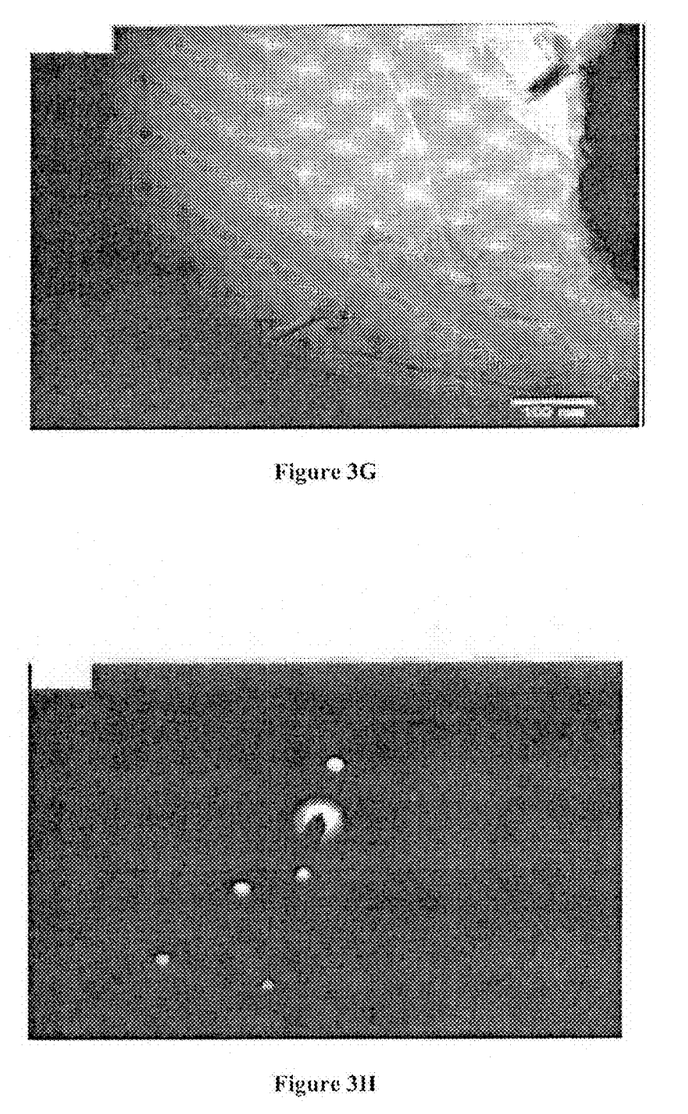

FIGS. 3a, 3b present SEM images of the copper foil substrate 56 with the graphene film grown on it after the arc run. SEM observations indicate the presence of graphene films covering almost the entire area of the Cu foil substrate with sizes of flakes being about several to tens of microns. By analyzing a large number of SEM images, amorphous carbon structures were observed on <5% of substrate area, which means that >95% of incoming carbon flux to the substrate was transferred to the form of graphene. The efficiency of transfer >95% allows the present system to provide graphene production at a rate of close to hundreds of mg per second (corresponding to tons of graphene per year per single arc setup) for high arc currents (about several hundred Amperes). The graphene films were then mechanically transferred to Cu mesh (by scratching the mesh over the substrate surface) and observed under Raman spectrometer. FIGS. 3c, 3d show microscope images of semi-transparent individual graphene flakes on the Cu mesh. The Raman spectra presented in FIGS. 3e, 3f indicates the presence of several layer graphene films on the substrate. The ratio of intensities of G to 2D peaks in the spectra was observed in the range of 1-3, which indicates that number of graphene layers was >2. The TEM images and electron diffraction pattern are presented in FIGS. 3g, 3h, showing the crystalline structure of synthesized thin (transparent) graphene platelets.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A method for synthesizing graphene, the method comprising:
providing a heated substrate;
producing a flux stream of carbon using an anodic arc discharge device having an anodic arc, and depositing material from the flux stream on the heated substrate, wherein the flux stream comprises a carbon vapor and the material deposited on the substrate comprises graphene; and
removing the deposited material from the substrate using a collection device,
wherein the method is conducted at a pressure of up to 500 Torr and a temperature of the substrate of about 700-1,200 degrees Celsius, and configuring a rate of producing the carbon vapor flux stream, a rate of depositing the graphene material from the flux stream onto the substrate, and the substrate temperature to form a single graphene layer on the substrate.

2. The method of claim 1, further comprising enclosing a heating element in a heating block, the heating element imparting heat to the heating block, and the heating block dispersing the heat from the heating element uniformly throughout the heating block to uniformly heat the substrate.

3. The method of claim 2, wherein the heating block is a solid cylindrical block and the substrate is a tube coaxially arranged about the cylindrical heating block.

4. The method of claim 2, wherein the substrate includes a conical top connected to a rotation device.

5. The method of claim 2, wherein the substrate and the heating block each have a cylindrical shape and the cylindrical heating block is concentrically arranged inside the cylindrical substrate whereby an inside diameter of the cylindrical substrate is greater than an outer diameter of the cylindrical heating block.

6. The method of claim 2, wherein the heating block comprises cement.

7. The method of claim 2, wherein the substrate is a tube with at least one open end, the heating block received in the open end of the substrate.

8. The method of claim 1, wherein the collection device comprises a brush.

9. The method of claim 1, wherein the flux stream is provided by an anode electrode and a cathode electrode.

10. The method of claim 1, further comprising rotating the heated substrate, depositing the flux stream on the rotating substrate at a first side of the substrate, and simultaneously removing the deposited material from a second side of the rotating substrate with the collection device, wherein the first side is different from the second side, and whereby the deposited graphene material has a thickness of one atom.

11. The method of claim 10, wherein the first side comprises a top portion of the substrate and the second side comprises a bottom portion of the substrate.

12. The method of claim 10, wherein the substrate is cylindrical and has a longitudinal axis that is substantially horizontal.

13. A method comprising:
providing a substrate;
embedding a heating element in a solid cylindrical cement heating block, the heating element imparting heat to the heating block, and the heating block dispersing the heat from the heating element uniformly throughout the heating block to uniformly heat the substrate to a temperature of 700-1,200 degrees Celsius;
producing a carbon vapor flux stream by an anodic arc discharge device having an anodic arc, and depositing a graphene material from the flux stream onto the heated substrate at a pressure of up to 500 Torr;
removing the deposited graphene material from the heated substrate using a collection device; and, configuring a rate of producing the carbon vapor flux stream, a rate of depositing the graphene material from the flux stream onto the substrate, and substrate temperature to form a single graphene layer on the substrate.

14. The method of claim 13, wherein the substrate is a tube coaxially arranged about the cylindrical heating block.

15. The method of claim 13, wherein the substrate has a cylindrical shape and the cylindrical heating block is concentrically arranged inside the cylindrical substrate whereby an inside diameter of the cylindrical substrate is greater than an outer diameter of the cylindrical heating block.

16. The method of claim 13, wherein the collection device comprises a brush.

17. The method of claim 13, further comprising rotating the substrate, wherein the carbon vapor flux stream is deposited on the rotating substrate at a first side of the rotating substrate simultaneously with the collection device removing the deposited graphene material from a second side of the rotating substrate, wherein the first side is different from the second side.

18. The method of claim 17, wherein the first side comprises a top portion of the substrate and the second side comprises a bottom portion of the substrate.

19. The method of claim 16, wherein the substrate is cylindrical and has a longitudinal axis that is substantially horizontal.

20. The method of claim 13, wherein the deposited graphene material has a thickness of one atom.

* * * * *